United States Patent
Tamachi et al.

(10) Patent No.: US 11,965,469 B2
(45) Date of Patent: Apr. 23, 2024

(54) CONTROL DEVICE OF INTERNAL COMBUSTION ENGINE

(71) Applicant: TOYOTA JIDOSHA KABUSHIKI KAISHA, Toyota (JP)

(72) Inventors: Toshiaki Tamachi, Seto (JP); Yoshito Sekiguchi, Kariya (JP); Masato Nakano, Toyota (JP); Koichi Okuda, Toyota (JP); Tatsuya Imamura, Okazaki (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/451,555

(22) Filed: Aug. 17, 2023

(65) Prior Publication Data
US 2024/0068420 A1 Feb. 29, 2024

(30) Foreign Application Priority Data
Aug. 23, 2022 (JP) .................................. 2022-132313

(51) Int. Cl.
*F02D 41/00* (2006.01)
*F02B 37/12* (2006.01)
*F02B 37/18* (2006.01)
*F02D 41/04* (2006.01)

(52) U.S. Cl.
CPC .......... *F02D 41/0007* (2013.01); *F02B 37/18* (2013.01); *F02D 41/04* (2013.01); *F02B 2037/122* (2013.01); *F02D 2200/0414* (2013.01)

(58) Field of Classification Search
CPC ............. F02D 2200/0414; F02D 41/04; F02D 41/0007; F02B 2037/122; F02B 37/18
See application file for complete search history.

(56) References Cited

U.S. PATENT DOCUMENTS

| 6,012,436 A * | 1/2000 | Boutcher ................ F02B 67/10 123/559.1 |
| 2006/0174624 A1* | 8/2006 | Grabowski ........... B60W 10/08 180/65.245 |

FOREIGN PATENT DOCUMENTS

JP 2016-118109 A 6/2016

* cited by examiner

*Primary Examiner* — Kevin A Lathers
(74) *Attorney, Agent, or Firm* — Finnegan, Henderson, Farabow, Garrett & Dunner, LLP (57) ABSTRACT

In an internal combustion engine having a cylinder in which an air-fuel mixture of gaseous fuel and intake air is combusted, an intake passage connected to the cylinder, and a supercharger for supercharging the intake air, in a case where backfire is generated in a set period before supercharging is performed by the supercharger, supercharging is performed at a smaller supercharging pressure than in a case where backfire is not generated in the set period.

5 Claims, 3 Drawing Sheets

CONTROL DEVICE OF INTERNAL COMBUSTION ENGINE

CROSS-REFERENCE TO RELATED APPLICATION

This application claims priority to Japanese Patent Application No. 2022-132313 filed on Aug. 23, 2022, incorporated herein by reference in its entirety.

BACKGROUND

1. Technical Field

The present disclosure relates to a control device of an internal combustion engine.

2. Description of Related Art

Japanese Unexamined Patent Application Publication No. 2016-118109 (JP 2016-118109 A) discloses an internal combustion engine and a control device thereof. The internal combustion engine includes a cylinder, an intake passage connected to the cylinder, and a water injection valve provided in the intake passage. In the internal combustion engine, during valve opening of an intake valve, a phenomenon in which an air-fuel mixture catches fire before ignition and a flame flows backward from the cylinder to the intake passage, so-called backfire, may occur. The control device of JP 2016-118109 A injects water from the water injection valve when a backfire occurs. As a result, the temperature of the intake passage decreases, and thus the occurrence of the backfire is suppressed.

SUMMARY

The internal combustion engine such as in JP 2016-118109 A may include a supercharger. During supercharging of the intake air by the supercharger, the temperature in the cylinder tends to increase in association with an increase in the engine load. Thus, catching fire before ignition is likely to occur. In addition, during supercharging, since the pressure in the intake passage and the cylinder increases, the flame tends to propagate. Therefore, the backfire is likely to occur during the operation of the internal combustion engine, particularly during supercharging. Assume that the technology of JP 2016-118109 A is adopted for an internal combustion engine including a supercharger, and water is injected into an intake passage during supercharging. Even in this case, a situation in which the pressure in the intake passage and the cylinder is high during the supercharging remains unchanged. Therefore, there is a possibility that backfire is not appropriately suppressed.

A control device for an internal combustion engine for solving the above problems is
   a control device of an internal combustion engine in which a control target is the internal combustion engine including a cylinder in which an air-fuel mixture of gaseous fuel and intake air is burned, an intake passage connected to the cylinder, and a supercharger that supercharges the intake air, in which the control device executes:
   a first process of determining whether a backfire occurs based on an operating state of the internal combustion engine; and
   a second process of performing supercharging with a smaller supercharging pressure when a backfire has occurred in a predetermined set period before supercharging is performed by the supercharger than when a backfire has not occurred in a set period.

In the above-described configuration, when the engine state is an engine state in which the backfire is likely to occur, supercharging is performed at a small supercharging pressure. As a result, the engine state during supercharging can be set to an engine state in which the backfire is hardly generated as much as possible. Therefore, occurrence of a backfire during supercharging can be suppressed.

A control device for an internal combustion engine for solving the above problems is
   a control device of an internal combustion engine in which a control target is the internal combustion engine including a cylinder in which an air-fuel mixture of gaseous fuel and intake air is burned, an intake passage connected to the cylinder, and a supercharger that supercharges the intake air, in which the control device executes:
   a first process of determining whether a backfire occurs based on an operating state of the internal combustion engine; and
   a second process of decreasing an upper limit value of a supercharging pressure by the supercharger when a backfire has occurred in a predetermined set period before supercharging is performed by the supercharger, compared to when a backfire has not occurred in the set period.

In the above-described configuration, when the engine state is an engine state in which the backfire is likely to occur, the upper limit value of the supercharging pressure is reduced. As a result, the engine state during supercharging can be set to an engine state in which the backfire is hardly generated as much as possible. Therefore, occurrence of a backfire during supercharging can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
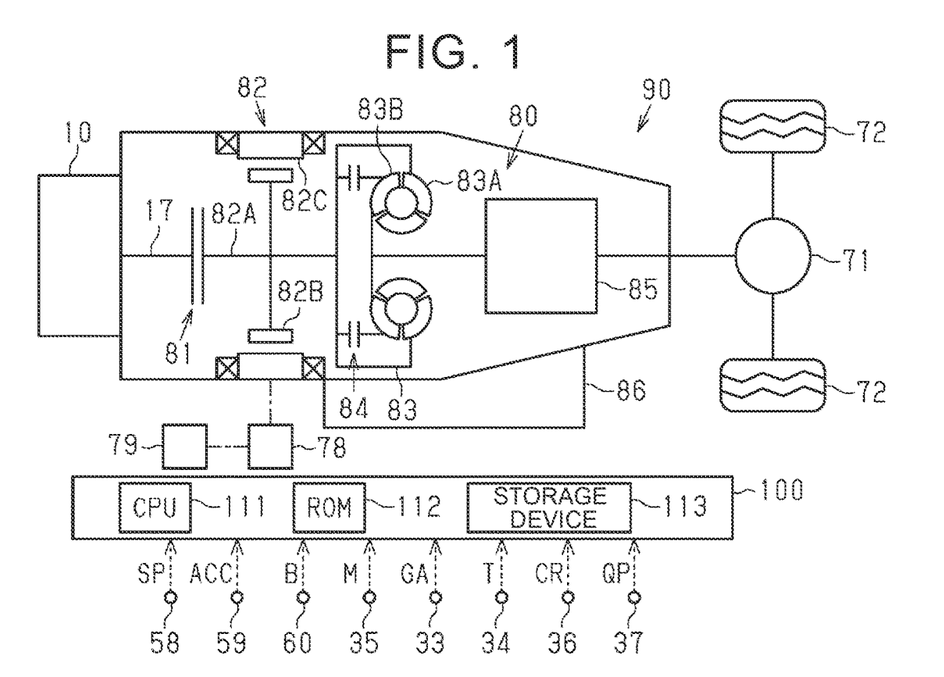
FIG. 1 is a schematic configuration diagram of a vehicle.

Hereinafter, a first embodiment of a control device for an internal combustion engine will be described with reference to the drawings.
Overall Configuration of the Vehicle
   As illustrated in FIG. 1, the vehicle 90 includes an internal combustion engine 10, a drive clutch 81, a motor generator 82, a transmission unit 80, a hydraulic mechanism 86, a differential 71, a plurality of drive wheels 72, an inverter 78, and a battery 79. The vehicle 90 is an on-board vehicle to which the internal combustion engine 10 is to be mounted.

The internal combustion engine 10 is a driving source of the vehicle 90. Details of the internal combustion engine 10 will be described later. The internal combustion engine 10 has a crankshaft 17. The motor generator 82 is a driving source of the vehicle 90. The motor generator 82 has functions of both an electric motor and a generator. The motor generator 82 includes a stator 82C, a rotor 82B, and a rotary shaft 82A. The rotor 82B is rotatable relative to the stator 82C. The rotary shaft 82A rotates integrally with the rotor 82B. The motor generator 82 is electrically connected to the battery 79 via an inverter 78. The battery 79 exchanges electric power with the motor generator 82. The inverter 78 performs DC-AC conversion.

The drive clutch 81 is interposed between the internal combustion engine and the motor generator 82. The drive clutch 81 is switched in the disconnected state in accordance with the hydraulic pressure from the hydraulic mechanism 86. When the hydraulic pressure is supplied, the drive clutch 81 is connected to the crankshaft 17 and the rotary shaft 82A of the motor generator 82. When the supply of the hydraulic pressure is stopped, the drive clutch 81 is disconnected from the crankshaft 17 and the rotary shaft 82A.

The transmission unit 80 includes a torque converter 83 and an automatic transmission 85. The torque converter 83 includes a pump impeller 83A, a turbine liner 83B, and a lock-up clutch 84. The torque converter 83 is a fluid coupling having a torque amplification function. The pump impeller 83A rotates integrally with the rotary shaft 82A of the motor generator 82. The turbine liner 83B rotates integrally with the input shaft of the automatic transmission 85. The lock-up clutch 84 receives the hydraulic pressure supplied from the hydraulic mechanism 86 and directly connects the pump impeller 83A and the turbine liner 83B.

The automatic transmission 85 is a stepped transmission capable of switching the gear ratio to multiple stages. The automatic transmission 85 includes a plurality of clutches and a plurality of brakes as engagement elements, and a plurality of planetary gear mechanisms. The engagement and disengagement states of the respective engagement elements are switched in accordance with the hydraulic pressure from the hydraulic mechanism 86. The automatic transmission 85 can form any one of a plurality of preset gear stages in accordance with the engagement and disengagement states of the respective engagement elements. Specifically, the automatic transmission 85 can form a forward-traveling gear, a reverse-traveling gear, and a non-traveling gear. Further, the automatic transmission 85 can form any one of a plurality of gear stages such as "first speed" to "fifth speed" in a gear stage for forward travel. An output shaft of the automatic transmission 85 is connected to the left and right drive wheels 72 via a differential 71. The differential 71 allows a difference in rotational speed to occur between the left and right drive wheels 72. The drive clutch 81, the motor generator 82, and the transmission unit 80 are housed in a single case. In other words, the drive clutch 81, the motor generator 82, and the transmission unit 80 are configured as an integral hybrid transformer wheel.

The vehicle 90 includes a vehicle speed sensor 58, an accelerator sensor 59, a battery sensor 60, and a trip meter 35. The vehicle speed sensor 58 detects the traveling speed of the vehicle 90 as the vehicle speed SP. The accelerator sensor 59 detects the amount of depression of the accelerator pedal in the vehicle 90 as the accelerator operating amount ACC. The battery sensor 60 detects battery information B such as a current, a voltage, and a temperature of the battery 79. The trip meter 35 measures the travel distance M of the vehicle 90 in meters.

Outline of Configuration of Internal Combustion Engine

Figure 2:
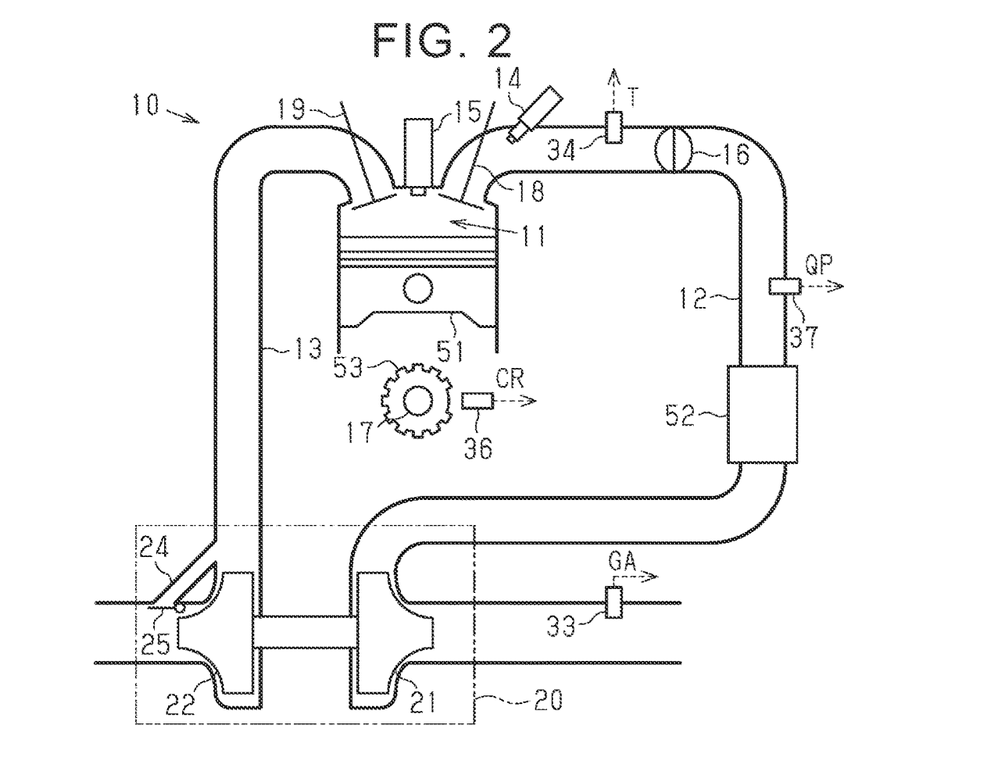
FIG. 2 is a schematic configuration diagram of an internal combustion engine.

As illustrated in FIG. 2, the internal combustion engine 10 includes a plurality of cylinders 11, a plurality of pistons 51, and the crankshaft 17. In FIG. 2, only one of the plurality of cylinders 11 is shown. The same applies to the piston 51. Although not shown, the internal combustion engine 10 includes a plurality of connecting rods. The piston 51 and the connecting rod are provided for each cylinder 11. The number of cylinders 11 is four.

The cylinder 11 is a space for burning an air-fuel mixture of fuel and intake air. The piston 51 is located in the cylinder 11. The piston 51 reciprocates in the cylinder 11. The piston 51 is connected to the crankshaft 17 via a connecting rod. The crankshaft 17 rotates in response to the reciprocation of the piston 51.

The internal combustion engine 10 includes a plurality of spark plugs 15. In FIG. 2, only one of the plurality of spark plugs 15 is shown. The spark plug 15 is provided for each cylinder 11. The tip of the spark plug 15 is located in the cylinder 11. The spark plug 15 ignites the air-fuel mixture in the cylinder 11.

The internal combustion engine 10 includes an intake passage 12, an intercooler 52, a throttle valve 16, a plurality of fuel injection valves 14, and an exhaust passage 13. The intake passage 12 is a passage for introducing intake air into the cylinder 11. The intake passage 12 is connected to each cylinder 11. The intercooler 52 is located in the middle of the intake passage 12. The intercooler 52 cools the intake air. The throttle valve 16 is located downstream of the intercooler 52 in the intake passage 12. The opening degree of the throttle valve 16 can be adjusted. The intake air volume GA changes according to the opening degree of the throttle valve 16. The fuel injection valve 14 is provided for each cylinder 11. The fuel injection valve 14 is located downstream of the throttle valve 16 in the intake passage 12. The fuel injection valve 14 supplies fuel into the cylinder 11 via the intake passage 12. The fuel injection valve 14 injects hydrogen as fuel. The exhaust passage 13 is a passage for discharging exhaust gas from each of the cylinders 11. The exhaust passage 13 is connected to each of the cylinders 11.

The internal combustion engine 10 includes a plurality of intake valves 18 and a plurality of exhaust valves 19. In FIG. 2, only one of the plurality of intake valves 18 is shown. The same applies to the exhaust valve 19. The intake valve 18 is provided for each cylinder 11. The intake valve 18 is located at a connection port with the cylinder 11 in the intake passage 12. The intake valve 18 opens and closes the connection port of the intake passage 12. The exhaust valve 19 is provided for each cylinder 11. The exhaust valve 19 is located at a connection port with the cylinder 11 in the exhaust passage 13. The exhaust valve 19 opens and closes the connection port of the exhaust passage 13.

The internal combustion engine 10 includes a supercharger 20. The supercharger 20 is provided across the intake passage 12 and the exhaust passage 13. The supercharger 20 includes a compressor wheel 21, a turbine wheel 22, a bypass passage 24, and a waste gate valve (hereinafter, referred to as WGV) 25. The compressor wheel 21 is located upstream of the intercooler 52 in the intake passage 12. The turbine wheel 22 is located in the middle of the exhaust passage 13. The turbine wheel 22 rotates in response to the flow of exhaust gas. The compressor wheel 21 rotates integrally with the turbine wheel 22. At this time, the compressor wheel 21 compresses and feeds the intake air. That is, the compressor wheel 21 supercharges the intake air.

The bypass passage 24 connects an upstream portion and a downstream portion of the exhaust passage 13 with respect to the turbine wheel 22. That is, the bypass passage 24 is a passage that bypasses the turbine wheel 22. WGV25 is located at the downstream end of the by-pass passage 24. The opening degree of WGV25 can be adjusted by an actuator. The greater the degree of opening of WGV25, the greater the volume of exhaust flowing through the by-pass passage 24 bypassing the turbine wheel 22. At the same time, the rotational speed of the turbine wheel 22 and the compressor wheel 21 decreases. At the same time, the supercharging pressure QP, which is the pressure of the intake air between the compressor wheel 21 and the throttle valve 16, in the intake passage 12 decreases.

The internal combustion engine 10 includes an airflow meter 33, a supercharging pressure sensor 37, and an intake air temperature sensor 34. The airflow meter 33 is located on the upstream side of the compressor wheel 21 in the intake passage 12. Airflow meter 33 detects the intake air volume GA. The supercharging pressure sensor 37 is located between the intercooler 52 and the throttle valve 16 in the intake passage 12. The supercharging pressure sensor 37 detects the supercharging pressure QP. The intake air temperature sensor 34 is located downstream of the throttle valve 16 in the intake passage 12. The intake air temperature sensor 34 detects a temperature T of the intake air on the downstream side with respect to the throttle valve 16 in the intake passage 12 (hereinafter, referred to as a downstream intake air temperature).

The internal combustion engine 10 includes a sensor plate 53 and a crank position sensor 36. The sensor plate 53 has a disk-shaped main body and a plurality of teeth protruding from the outer periphery of the main body. The main body rotates integrally with the crankshaft 17. The plurality of teeth is basically arranged at equal intervals. However, there is one missing portion in which the distance between adjacent teeth is larger than the other. The crank position sensor 36 is located at a position facing the outer periphery of the sensor plate 53. As the sensor plate 53 rotates with rotation of the crankshaft 17, the crank position sensor 36 alternately faces the teeth of the sensor plate 53 and the void between adjacent teeth. The crank position sensor 36 outputs an L signal when facing the teeth of the sensor plate 53, and outputs an H signal when facing the air gap portion. Corresponding to the arrangement of the teeth described above, the crank position sensor 36 outputs the L signal and the H signal alternately at basically constant normal intervals. The crank position sensor 36 outputs a toothless signal, which is an H signal with an interval longer than the normal interval, only when the toothless portion passes in front of the crank position sensor 36. Hereinafter, the respective signals outputted by the crank position sensor 36 are collectively referred to as a crank signal CR. In the present embodiment, when the piston 51 of the specific cylinder, which is one of the four cylinders 11, is located at the top dead center, the position of the toothless portion is determined so that the tooth located next to the toothless portion and the crank position sensor 36 face each other. During rotation of the sensor plate 53, the teeth face the crank position sensor 36 after passing through the toothless portion. In this setting, the crank signal CR is switched from the tooth-missing signal to the L signal before and after the piston 51 of the particular cylinder reaches the top dead center.

The internal combustion engine 10 is a four-stroke one-cycle engine in which an intake stroke, a compression stroke, an expansion stroke, and an exhaust stroke of each cylinder 11 are rotated by 720 degrees by the crankshaft 17. Hereinafter, a series of periods in which one cylinder 11 enters an intake stroke, a compression stroke, an expansion stroke, and an exhaust stroke one by one will be referred to as one combustion cycle.

Schematic Configuration of the Control Device

As illustrated in FIG. 1, the vehicle 90 includes a control device 100. The control device 100 may be configured as one or more processors that execute various processes according to a computer program (software). Note that the control device 100 may be configured as a circuit (circuitry) including one or more dedicated hardware circuits such as an application-specific integrated circuit (ASIC) that executes at least some of various processes, or a combination thereof. The processor includes memories such as CPU 111 and RAM and ROM 112. The memory stores program code or instructions configured to cause CPU 111 to execute the process. The memory, that is, a computer readable medium includes any available medium accessible by a general purpose or dedicated computer. The control device 100 includes a real-time clock that is a circuit that generates date and time information. The control device 100 includes a storage device 113, which is an electrically rewritable non-volatile memory.

The control device 100 repeatedly receives information detected or measured by various information acquisition devices attached to the vehicle 90. Specifically, the control device 100 receives the following information.

Intake air volume GA detected by the airflow meter 33
Supercharging pressure QP detected by the supercharging pressure sensor 37
Downstream intake air temperature T detected by the intake air temperature sensor 34
Vehicle speed SP detected by the vehicle speed sensor 58
Acceleration manipulation ACC detected by the accelerator sensor 59
Battery information B detected by the battery sensor 60
Travel distance M of the vehicle 90 measured by the trip meter 35

In addition to the above, the control device 100 repeatedly receives the crank signal CR outputted by the crank position sensor 36. The control device 100 calculates a rotational position (hereinafter referred to as a crank position) CRA of the crankshaft 17 as needed based on the transition of the crank signal CR. Specifically, the control device 100 sets the crank position CRA when the crank signal CR is switched from the tooth-missing signal to the L signal to zero degrees. Based on the crank position CRA, the control device 100 calculates the crank position CRA from 0 degrees to 360 degrees in accordance with the transition of the crank signal CR. The control device 100 sets the crank position CRA when the piston 51 of the particular cylinder is positioned at the top dead center to zero degrees in balance with the position of the toothless portion described above.

In addition to the crank position CRA, the control device 100 calculates the following parameters as needed. The control device 100 calculates an engine rotational speed NE, which is a rotational speed of the crankshaft 17, based on the transition of the crank signal CR received from the crank position sensor 36. Further, the control device 100 calculates the engine load factor KL based on the engine rotational speed NE and the intake air volume GA. The engine load factor KL is a parameter that determines the quantity of air to be filled in the cylinder 11. Specifically, the engine load factor KL is a ratio of the amount of air flowing into one cylinder 11 per combustion cycle to the reference amount of air. The reference airflow rate varies depending on the engine rotational speed NE. Further, the control device 100 calculates the charge ratio SOC of the battery 79 based on the battery data B. The charge ratio SOC of the battery 79 is a ratio of the remaining charge amount to the full charge capacity of the battery 79.

The control device 100 controls various parts of the vehicle 90. For example, the control device 100 controls the internal combustion engine 10 and the motor generator 82. When controlling the internal combustion engine 10 and the motor generator 82, the control device 100 calculates a required driving force, which is a required value of the driving force required for the traveling of the vehicle 90, based on the accelerator operating amount ACC and the vehicle speed SP. Then, the control device 100 determines the torque distribution of the internal combustion engine 10 and the motor generator 82 based on the required driving force and the charge ratio SOC of the battery 79. Then, the control device 100 calculates an engine required torque, which is torque that needs to be output by the internal combustion engine 10 in order to realize the required driving force, and a motor required torque, which is torque that needs to be output by the motor generator 82. The control device 100 controls the internal combustion engine 10 and the motor generator 82 based on the required torque. During traveling of the vehicle 90, the control device 100 repeats calculation of each required torque and control of the internal combustion engine 10 and the motor generator 82 based on the required torque.

In controlling the internal combustion engine 10, the control device 100 controls various control amounts in the internal combustion engine 10 by operating various operating target devices such as the throttle valve 16, the fuel injection valve 14, the spark plug 15, and WGV25. Examples of the various control amounts include an intake air volume GA, an injection fuel amount, and a supercharging pressure QP. The control device 100 controls the various control amounts so that the actual torque of the internal combustion engine 10 matches the engine required torque. When the second process described later is executed, the actual torque of the internal combustion engine 10 becomes smaller than the engine required torque. In this case, the control device 100 compensates for the decrease in torque by the motor generator 82.

The control device 100 stops the internal combustion engine 10 to drive only the motor generator 82 or drives the motor generator 82 while operating the internal combustion engine 10 according to a situation. In the former case, the control device 100 sets the drive clutch 81 to the disconnected state, and in the latter case, sets the drive clutch 81 to the connected state. For example, when there is a margin in the charge ratio SOC of the battery 79, the control device 100 stops the operation of the internal combustion engine when the required driving force is relatively small, and operates the internal combustion engine 10 when the required driving force is relatively large. An example of a case where the required driving force is small is a case where the vehicle 90 starts, a case where the vehicle travels under a light load with a small forward acceleration, or the like. The operation of the internal combustion engine 10 is to burn the air-fuel mixture in each cylinder 11 by fuel injection and ignition. As a result, the engine rotational speed NE becomes greater than zero.

The control device 100 also controls the automatic transmission 85. The control device 100 calculates a target shift stage, which is a target value of the shift stage of the automatic transmission 85, based on the accelerator operating amount ACC and the vehicle speed SP. Then, the control device 100 controls the automatic transmission 85 so that the actual gear position matches the target gear position. The control device 100 repeats calculation of the target gear position and control of the automatic transmission 85 while the vehicle 90 is traveling.

Details of the Process for the Internal Combustion Engine

The control device 100 can execute the first process as a process for grasping the engine state during the operation of the internal combustion engine 10. The first process is a process for determining whether a backfire has occurred. The backfire is a phenomenon in which the air-fuel mixture ignites before ignition during opening of the intake valve 18, and the flame flows backward from the cylinder 11 to the intake passage 12. That is, the backfire is a phenomenon occurring in the intake stroke of each cylinder 11. Here, in the internal combustion engine 10, hydrogen is adopted as a fuel. Hydrogen, for example, is more likely to ignite than gasoline, and therefore is more likely to ignite when the fuel injection valve 14 injects the hydrogen into the cylinder 11 during the intake stroke. On this assumption, during the supercharging of the intake air by the supercharger 20, the temperature in the cylinder 11 tends to increase in association with the increase in the engine load factor KL. When the temperature in the cylinder 11 increases, ignition before ignition is likely to occur. In addition, during supercharging, the pressure of the gas in the intake passage 12 and the cylinder 11 increases, so that the flame tends to propagate. In combination with these circumstances, backfire is likely to occur during the operation of the internal combustion engine 10, particularly during supercharging.

The control device 100 continues the first process during the operation of the internal combustion engine 10. Here, when a backfire occurs in a certain cylinder 11, the downstream intake air temperature T instantaneously increases within the period of the intake stroke of the cylinder 11. Therefore, in the first process, the control device 100 constantly monitors the downstream intake air temperature T detected by the intake air temperature sensor 34. Then, the control device 100 determines whether or not the specified condition is satisfied for each 180-degree interval of the crank position CRA based on the zero-degree of the crank position CRA. The specific condition is that a state in which the downstream intake air temperature T exceeds the determination temperature continues for the determination period. The control device 100 determines that the backfire has occurred when the specific condition is satisfied, and determines that the backfire has not occurred when the specific condition is not satisfied. When determining whether or not backfire has occurred, the control device 100 stores an index value indicating the determination result in the storage device 113. For example, the control device 100 causes the storage device 113 to store "1" when it is determined that the backfire has occurred, and "2" when it is determined that the backfire has not occurred. The control device 100 repeats the determination and the recording of the determination at intervals of 180 degrees in the crank position CRA. That is, the control device 100 determines the presence or absence of backfire for each intake stroke of each cylinder 11. Then, the control device 100 obtains four determination results in one combustion cycle. Note that the control device 100 stores a predetermined number of data in the storage device 113 over time while overwriting old data with new data. The control device 100 treats this data group over time as a backfire generation data group. The predetermined number is twice as many as the number of times of setting described later. This predetermined number corresponds to the number of times of execution of the intake stroke when the crankshaft 17 repeatedly rotates by the set number of times.

The control device 100 stores the determination temperature and the determination period in advance. The determination temperature is predetermined, for example, in experiments or simulations, as a considerably higher temperature that can be detected when backfire occurs. In addition, the determination period is determined in advance by, for example, an experiment or a simulation as the minimum length that the state in which the downstream intake air temperature T becomes equal to or higher than the determination temperature continues when the backfire occurs.

Treatment for Supercharging

When the engine required torque exceeds the specified torque, the control device 100 causes the internal combustion engine 10 to supercharge the intake air. The control device 100 can execute a basic process as a preliminary process for performing supercharging. The basic process is a process for calculating a basic supercharging pressure QPn that is a basic value of the target supercharging pressure QPt. The target supercharging pressure QPt is a target value of the supercharging pressure QP. The control device 100 continues the basic processing during the operation of the internal combustion engine 10. In the basic process, the control device 100 repeats the calculation of the basic supercharging pressure QPn. The basic supercharging pressure QPn is a supercharging pressure QP required to realize the current engine required torques under the current engine speed NE and engine load factor KL. The control device 100 calculates the basic supercharging pressure QPn based on the latest engine required torque, the latest engine rotational speed NE, and the latest engine load factor KL. If this basic supercharging pressure QPn is greater than zero, a supercharging requirement will arise.

The control device 100 can execute the supercharging process as a process for actually performing the supercharging when the supercharging request occurs. The supercharging process is a process in which the calculation of the target supercharging pressure QPt and the control of WGV25 based on the target supercharging pressure QPt are repeated. The control of WGV25 based on the target supercharging pressure QPt is to feedback-control the opening degree of WGV25 so that the actual supercharging pressure QP detected by the supercharging pressure sensor 37 matches the target supercharging pressure QPt. In order to feedback-control the opening degree of WGV25, the control device 100 outputs a command to the actuator so as to operate WGV25.

The supercharging process includes a normal process and a second process. The normal process and the second process differ in how the target supercharging pressure QPt is set. The control device 100 performs the normal processing in a case where the backfire has not occurred in the setting period before the supercharging is performed by the supercharger 20. In this normal process, the control device 100 sets the basic supercharging pressure QPn as the target supercharging pressure QPt.

On the other hand, the control device 100 performs the second process in a case where the backfire has occurred in the setting period before the supercharging. In the second process, the control device 100 performs supercharging with a supercharging pressure QP that is smaller than that when no backfire is generated in the setting period prior to supercharging. As a specific process for this purpose, in the second process, the control device 100 calculates the adjusted supercharging pressure ΔQP as an adjustment value for reducing the supercharging pressure QP. Then, the control device 100 sets, as the target supercharging pressure QPt, a value obtained by subtracting the adjusted supercharging pressure ΔQP from the basic supercharging pressure QPn, as shown in the following Equation (1). The target supercharging pressure QPt is smaller than the target supercharging pressure QPt when the normal process is performed in a situation where the engine required torque, the engine rotational speed NE, and the engine load factor KL are the same, by an amount corresponding to the adjusted supercharging pressure ΔQP.

$$QPt = QPn - \Delta QP \quad (1)$$

When the adjusted supercharging pressure ΔQP exceeds the basic supercharging pressure QPn, the control device 100 sets zero as the target supercharging pressure QPt.

Figure 3:
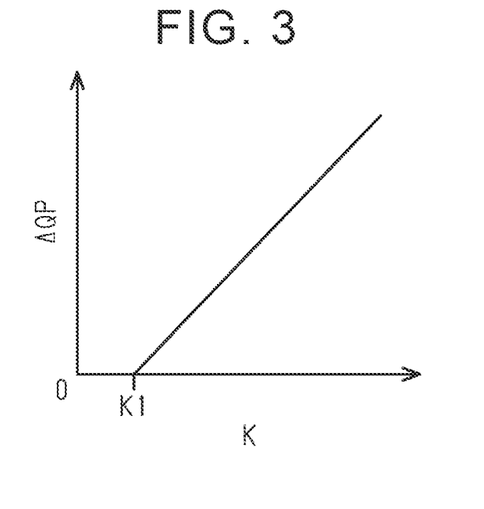
FIG. 3 is a diagram illustrating an example of a characteristic map.

The control device 100 stores in advance a specific map as information for calculating the adjusted supercharging pressure ΔQP. As illustrated in FIG. 3, the specific map represents a relationship between the occurrence frequency K of the backfire and the adjusted supercharging pressure ΔQP in the set period. In the present embodiment, the occurrence frequency K of the backfire is the number of occurrence times of the backfire in the setting period itself. The specific map is created on the basis of an experiment or a simulation on the assumption that the occurrence of the backfire is detected by the method of the first process.

In the specific map, the occurrence frequency K of the backfire and the adjusted supercharging pressure ΔQP have the following relationship. When the occurrence frequency K of the backfire is less than the execution-threshold K1, the adjusted supercharging pressure ΔQP is zero. On the other hand, when the occurrence frequency K of the backfire is equal to or higher than the execution-threshold K1, the adjusted supercharging pressure ΔQP increases as the occurrence frequency K of the backfire is higher. The adjusted supercharging pressure ΔQP corresponds to a reduction range from the basic supercharging pressure QPn in setting the target supercharging pressure QPt. That is, the large adjusted supercharging pressure ΔQP means that the target supercharging pressure QPt is made smaller than when no backfire occurs. When the basic supercharging pressure QPn is the same, the target supercharging pressure QPt becomes smaller as the frequency K of backfire is higher.

Execution-threshold K1 will be described. Here, the occurrence frequency K of the backfire is an index indicating an engine state regarding the likelihood of occurrence of the backfire. Then, the higher the occurrence frequency K of the backfire, it can be said that the engine state backfire is likely to occur. The execution-threshold K1 is determined as the smallest value of the supercharging pressure QP that ensures that the internal combustion engine 10 is in an engine condition in which backfire is likely to occur, and that measures to suppress the occurrence of backfire are required.

The setting period will be described. The set period is determined in advance as a period suitable for grasping whether or not the internal combustion engine 10 is currently in a situation where backfire is likely to occur. In the present embodiment, the setting period is predetermined as a period in which the crankshaft 17 rotates by a predetermined number of times, for example, 2000 times. In other words, the set period is defined as a period during which the internal combustion engine 10 performs a combustion cycle a predetermined number of times. As described above, the setting time of the present embodiment is not constant as viewed on a time-scale, and is variable in accordance with the engine rotational speed NE.

Specific Processing Routine for Supercharging

Figure 4:
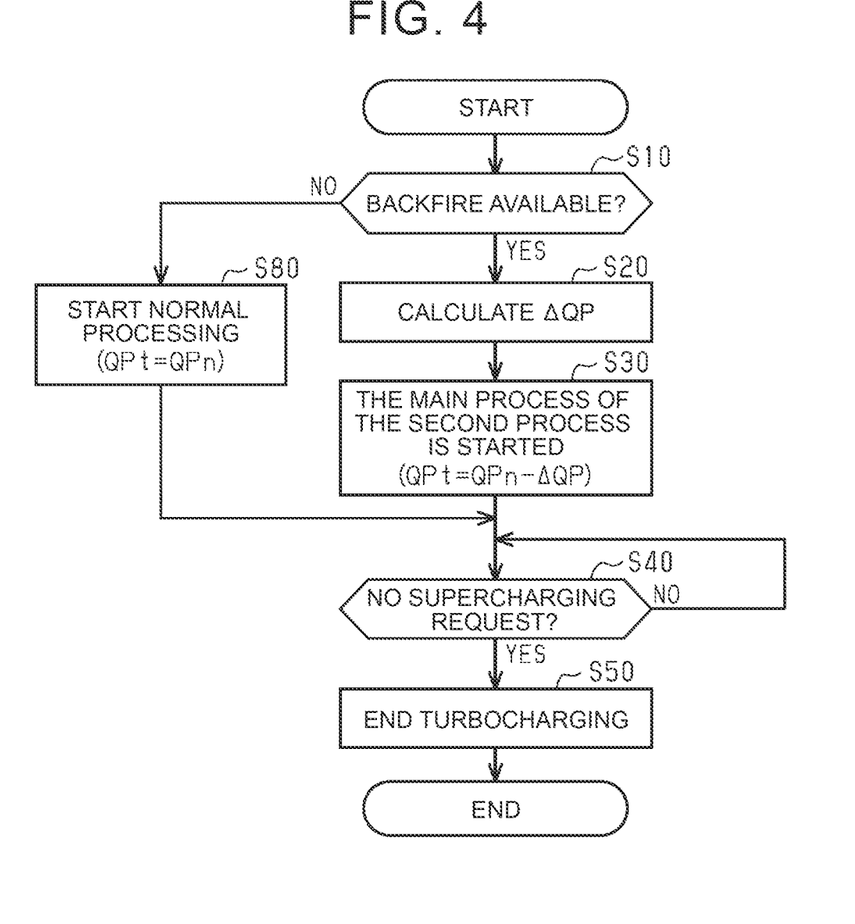
FIG. 4 is a flowchart illustrating a processing procedure of the supercharging routine according to the first embodiment.

As illustrated in FIG. 4, when a supercharging request occurs, the control device 100 starts a processing routine (hereinafter, referred to as a supercharging routine) for supercharging the intake air. That is, the control device 100 starts the supercharging routine when the basic supercharging pressure QPn is changed from the basic supercharging pressure QPn calculated in the basic process to a value greater than zero. When the supercharging routine is started, the control device 100 first executes S10 process.

In S10, the control device 100 determines whether or not a backfire has occurred between the current time point and the pre-set time point. Specifically, the control device 100 refers to the generated data group created in the first process. In relation to the above-described generation method of the generated data group, the generated data group represents the presence or absence of the occurrence of the backfire over time from the setting timing to the present time. The setting timing is a time point that is traced back from the current time point by a period in which the crankshaft 17 rotates a set number of times, that is, a time point that is traced back from the current time point by a set period. The control device 100 determines whether at least one identification value indicating occurrence of the backfire is present in the generated data group. The control device 100 advances the process to S80 if there is no identification indicating the occurrence of a backfire (S10:NO).

In S80, the control device 100 selects the normal process as the supercharging process. Then, the control device 100 starts the supercharging of the intake air by the normal processing. That is, after this, the control device 100 controls WGV25 using the latest basic supercharging pressure QPn calculated in the basic process as the target supercharging pressure QPt as it is. The control device 100 repeatedly calculates the target supercharging pressure QPt and controls WGV25 based on the target supercharging pressure QPt. Here, the basic supercharging pressure QPn calculated by the control device 100 in the basic process changes as needed according to the transition of the engine required torque or the like. The control device 100 performs feedback-control of the opening degree of WGV25 in accordance with the basic supercharging pressure QPn so that the basic supercharging pressure QPn that changes as needed can be realized until the normal process is completed in S50 described later. When the normal processing is started, the control device 100 advances the processing to S40.

On the other hand, in S10, the control device 100 advances the process to S20 when at least one identification value indicating occurrence of the backfire exists in the generation data group (S10:YES).

In S20, the control device 100 selects the second process as the supercharging process. Then, the control device 100 calculates the adjusted supercharging pressure ΔQP as the processing in the preparation stage of the second processing. Specifically, the control device 100 refers to the generation data group. Then, the control device 100 counts the number of occurrences of the backfire. Then, the control device 100 treats the counted number of occurrences of backfire as a pre-supercharging frequency, which is an occurrence frequency K of backfire during a period from the current time point to a pre-setting period. Next, the control device 100 refers to the specific map. Then, the control device 100 calculates the adjusted supercharging pressure ΔQP corresponding to the pre-supercharging frequency based on the specific map. Thereafter, the control device 100 advances the process to S30.

In S30, the control device 100 starts the main process of the second process. That is, thereafter, the control device 100 repeats the calculation of the target supercharging pressure QPt using Equation 1 and the control of WGV25 based on the target supercharging pressure QPt. In calculating the target supercharging pressure QPt, the control device 100 applies the latest basic supercharging pressure QPn calculated at any time in the basic process and the adjusted supercharging pressure ΔQP calculated by S20 to (Expression 1). As described in S80, the basic supercharging pressure QPn calculated by the control device 100 in the basic process changes as needed. In response to this, the target supercharging pressure QPt calculated by the control device 100 at the respective timings by using Equation 1 also changes as needed. The control device 100 performs feedback-control of the opening degree of WGV25 so as to realize the target supercharging pressure QPt that changes as needed until the second process is completed in S50 described later. When the main process of the second process is started, the control device 100 advances the process to S40. Note that the control device 100 makes the torque of the motor generator 82 larger than the motor required torque grasped from the required driving force during the execution of the second process. Specifically, the control device 100 calculates an estimated value of the torque of the current internal combustion engine 10 based on the latest engine rotational speed NE, the latest engine load factor KL, the latest target supercharging pressure QPt, and the like. Then, the torque of the motor generator 82 is made larger than the motor required torque by the absolute value of the difference between the estimated value and the engine required torque.

In S40, the control device 100 determines whether or not the supercharging demand has disappeared. Specifically, the control device 100 determines whether or not the basic supercharging pressure QPn calculated in the basic process has been switched from a value greater than zero to zero. When the basic supercharging pressure QPn continues to be greater than zero (S40:NO), the control device 100 executes S40 process again. The control device 100 repeats S40 process until the basic supercharging pressure QPn is switched to 0. When the basic supercharging pressure QPn is switched to 0 (S40:YES), the control device 100 advances the process to S50.

In S50, the control device 100 ends the supercharging process currently being executed. Thereafter, the control device 100 ends the series of processes of the supercharging routine.

Operation of the First Embodiment

Assume that backfires are occurring frequently. Suppose there is a supercharging request under this condition. Then, the control device 100 calculates the adjusted supercharging pressure ΔQP corresponding to the occurrence frequency K of the backfire from the current time point to the pre-set time period (S20). Then, the control device 100 controls WGV25 by setting a value obtained by subtracting the adjusted supercharging pressure ΔQP from the basic supercharging pressure QPn as the target supercharging pressure QPt (S30).

Effect of the 1 Embodiment (1-1) When a backfire occurs in a set period before a supercharging request occurs, the engine state at the time when the supercharging request occurs is often such that a backfire is likely to occur. In this case, supercharging may be performed under an engine state in which backfire is likely to occur. Therefore, in the present embodiment, when the backfire occurs prior to the occurrence of the supercharging demand, the supercharging is performed with a smaller supercharging pressure QP than when the backfire does not occur. As a result, the engine state during supercharging can be set to an engine state in which backfire is hardly generated as much as possible. Therefore, occurrence of backfire during supercharging can be suppressed.

(1-2) As described above, the occurrence frequency K of the backfire in the setting period is an index indicating the engine state regarding the likelihood of occurrence of the backfire. Then, as the occurrence frequency K of the backfire is higher, the engine state backfire is likely to occur. Therefore, in the present embodiment, the adjusted supercharging pressure ΔQP, which is the reduction range of the target supercharging pressure QPt, is increased as the occurrence frequency K of the backfire is higher, that is, as the backfire is more likely to occur. In this way, by determining the reduction range of the target supercharging pressure QPt in accordance with the ease of generation of the backfire, the backfire can be suppressed more appropriately.

(1-3) If the number of combustion cycles, that is, the number of times the intake stroke is performed is large, the occurrence frequency K of the backfire may be increased accordingly. In the present embodiment, the set period is determined by the number of combustion cycles. Therefore, it is possible to determine the adjusted supercharging pressure ΔQP, which is the reduction range of the target supercharging pressure QPt, based on the occurrence frequency K of the backfire generated in the same number of combustion cycles. Therefore, it is possible to set a more appropriate target supercharging pressure QPt for suppressing backfire.

Second Embodiment

A second embodiment of a control device for an internal combustion engine will be described. In the second embodiment, only the contents of the supercharging process are different from those in the first embodiment. Hereinafter, portions different from those of the first embodiment will be mainly described, and the description of the contents overlapping with those of the first embodiment will be simplified or omitted.

As in the first embodiment, in the supercharging process, the control device 100 repeats the calculation of the target supercharging pressure QPt and the control of WGV25 based on the target supercharging pressure QPt. However, in the present embodiment, the control device 100 calculates the target supercharging pressure QPt by a method that differs from that of the first embodiment. Specifically, the control device 100 considers the upper limit of the supercharging pressure QP by the supercharger 20 in calculating the target supercharging pressure QPt. The control device 100 stores the basic upper limit value Vs in advance. The basic upper limit value Vs is predetermined, for example, experimentally or in a simulation, as the upper limit value of the supercharging pressure QP that is allowed when the suppression of the backfire does not need to be considered. The basic upper limit value Vs is a value determined by considering limits determined from various specifications of the internal combustion engine 10, such as the volume of the cylinder 11 and the supercharging capability of the supercharger 20. The control device 100 calculates the upper limit supercharging pressure Vm, which is the upper limit value of the supercharging pressure QP to be set at present, on the basis of the basic upper limit value Vs in a pre-stage of calculating the target supercharging pressure QPt. Then, the control device 100 calculates the target supercharging pressure QPt using the upper limit supercharging pressure Vm as an upper limit.

As described in the first embodiment, the supercharging process includes a normal process and a second process. The normal processing is performed in a case where the backfire has not occurred before the supercharging. The second process is performed in a case where a backfire has occurred before the supercharging. In the present embodiment, the method of setting the upper limit supercharging pressure Vm differs between the normal process and the second process. In the normal process, the control device 100 sets the above-described basic upper limit value Vs as the upper limit supercharging pressure Vm.

On the other hand, in the second process, the control device 100 reduces the upper limit supercharging pressure Vm as compared with the case where the backfire has not occurred in the setting period prior to the supercharging. As a specific process for this purpose, in the second process, the control device 100 calculates the adjusted supercharging pressure ΔQP as an adjustment value for reducing the upper limit supercharging pressure Vm. Then, the control device 100 sets a value obtained by subtracting the adjusted supercharging pressure ΔQP from the basic upper limit value Vs as the upper limit supercharging pressure Vm, as shown in the following Expression 2. The upper limit supercharging pressure Vm is smaller than the upper limit supercharging pressure Vm when the normal process is performed by an amount corresponding to the adjusted supercharging pressure ΔQP.

$$Vm = Vs - \Delta QP \qquad \text{(Equation 2)}$$

The control device 100 stores in advance a specific map similar to that of the first embodiment as information for calculating the adjusted supercharging pressure ΔQP. That is, the specific map represents the relationship between the occurrence frequency K of the backfire and the adjusted supercharging pressure ΔQP in the set period. However, the adjustment supercharging pressure ΔQP defined in the particular map of the present embodiment is dedicated to adjustment of the upper limit supercharging pressure Vm. The maximum value of the adjusted supercharging pressure ΔQP defined in the specified map is smaller than the basic upper limit value Vs. As described in the first embodiment, the occurrence frequency K of the backfire and the adjusted supercharging pressure ΔQP have the following relationships. When the occurrence frequency K of the backfire is less than the execution-threshold K1, the adjusted supercharging pressure ΔQP is zero. On the other hand, when the occurrence frequency K of the backfire is equal to or higher than the execution-threshold K1, the adjusted supercharging pressure ΔQP increases as the occurrence frequency K of the backfire is higher. In the same manner as in the first embodiment, the occurrence frequency K of the backfire is the number of occurrences of the backfire in the setting period.

Operation of the Second Embodiment

Figure 5:
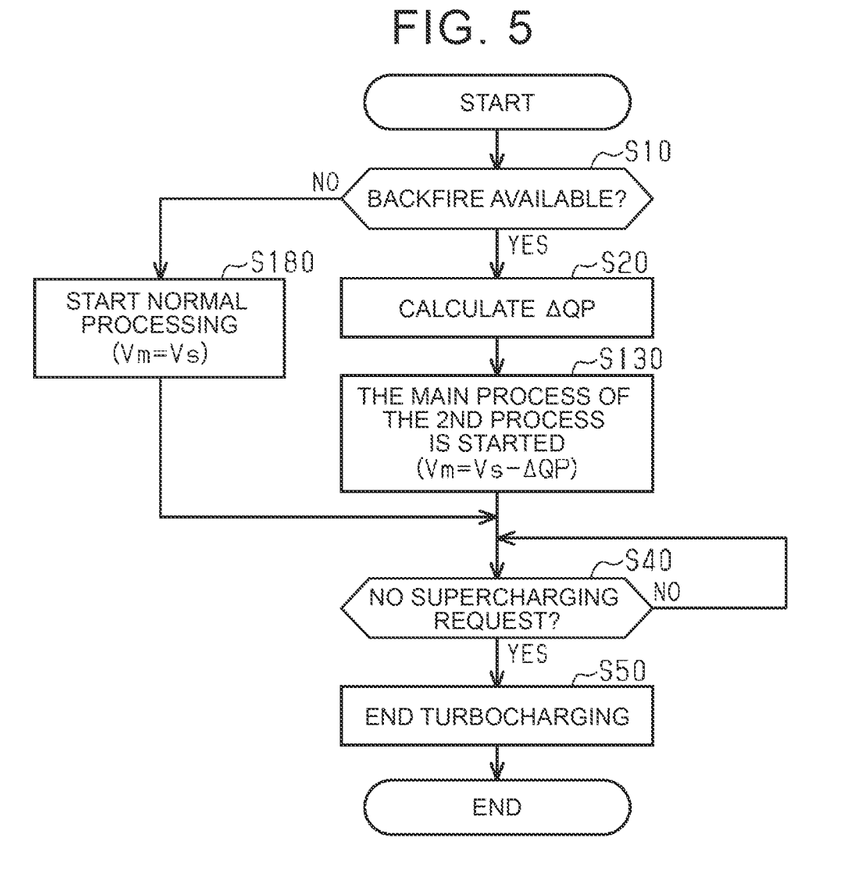
FIG. 5 is a flow chart showing a process of the supercharging routine according to the second embodiment.

As an operation of the present embodiment, a process performed by the supercharging routine shown in FIG. 5 will be briefly described. Note that S10, S40 and S50 processes are the same as those in the first embodiment, and therefore will not be described. If the control device 100 determines that a backfire has not occurred in S10 (S10:NO), the process proceeds to S180. In this case, the control device 100 starts the supercharging of the intake air by the normal processing. As described above, in the normal process, the control device 100 sets the basic upper limit value Vs to the upper limit supercharging pressure Vm as it is. Then, the control device 100 calculates the smaller one of the upper limit supercharging pressure Vm and the newest basic supercharging pressure QPn as the target supercharging pressure QPt. Then, the control device 100 controls WGV25 based on the target supercharging pressure QPt. The control device 100 repeatedly calculates the target supercharging pressure QPt and controls WGV25 based on the target supercharging pressure QPt.

On the other hand, when the control device 100 determines that a backfire has occurred in S10 (S10:YES), the process proceeds to S20. Then, in S20, the control device 100 calculates the adjusted supercharging pressure ΔQP in the same manner as in S20 of the first embodiment. Thereafter, in S130, the control device 100 starts the main process of the second process. As described above, in the second process, the control device 100 calculates the upper limit supercharging pressure Vm by applying the basic upper limit value Vs and the adjusted supercharging pressure ΔQP calculated by S20 to (Expression 2). Then, the control device 100 calculates the smaller one of the upper limit supercharging pressure Vm and the newest basic supercharging pressure QPn as the target supercharging pressure QPt. Then, the control device 100 controls WGV25 based on the target supercharging pressure QPt. The control device 100 repeatedly calculates the target supercharging pressure QPt and controls WGV25 based on the target supercharging pressure QPt.

Effect of the 2 Embodiment (2-1) As described in the first embodiment, in a case where a backfire has occurred in a setting period before a supercharging request occurs, the engine state at the time when the supercharging request occurs is often such that a backfire is likely to occur. Therefore, in the present embodiment, when the backfire occurs prior to the occurrence of the supercharging demand, the upper limit supercharging pressure Vm is made smaller than in the case where the backfire does not occur. As a result, the supercharging can be performed with the supercharging pressure QP as low as possible. Thus, the engine state during supercharging can be set to an engine state in which backfire is hardly generated as much as possible. Therefore, occurrence of backfire during supercharging can be suppressed.

(2-2) In the present embodiment, the adjusted supercharging pressure ΔQP, which is the lowering range of the upper limit supercharging pressure Vm, is increased as the occurrence frequency K of the backfire is higher, that is, as the backfire is more likely to occur. In this way, by determining the lowering range of the upper limit supercharging pressure Vm according to the ease of occurrence of the backfire, it is possible to more appropriately suppress the backfire.

(2-3) As in the first embodiment, in the present embodiment, the set period is determined by the number of combustion cycles. Therefore, the adjusted supercharging pressure ΔQP, which is the lowering range of the upper limit supercharging pressure Vm, can be determined based on the frequency K of occurrence of the backfire generated in the same number of combustion cycles. Therefore, it is possible to set a more appropriate upper limit supercharging pressure Vm for suppressing backfire.

Example of Change

Incidentally, each of the aforementioned embodiments can be carried out after being changed as follows. Each of the embodiments and modifications described below may be combined with each other and carried out unless there is any technical inconsistency.

The method of determining the presence or absence of backfire in the first process is not limited to the example of the above-described embodiment. For example, the presence or absence of occurrence of backfire may be determined using a parameter other than the downstream intake air temperature T. Here, when the backfire occurs, the pressure of the intake air on the downstream side with respect to the throttle valve 16 in the intake passage 12 instantaneously increases. With this point in mind, the presence or absence of occurrence of backfire may be determined based on the change in the pressure of the intake air on the downstream side with respect to the throttle valve 16 in the intake passage 12. In the case of adopting such a mode, an intake pressure sensor for detecting the pressure of the intake air may be mounted on the downstream side of the throttle valve 16 in the intake passage 12. In addition, the presence or absence of backfire may be determined by using the transition of the pressure of the gas in the cylinder 11, the transition of the engine speed NE, and the like. The determination method is not limited as long as it is a method of determining the occurrence of backfire based on the operating state of the internal combustion engine 10 and can appropriately capture the occurrence of backfire.

The method of recording the determination result in the first process is not limited to the example of the above-described embodiment. The method of recording the determination result may be any method as long as the occurrence state of the backfire in the previous stage can be grasped when the supercharging request occurs. As in the subsequent modification example, the data group necessary for grasping the occurrence frequency K of the backfire differs depending on how the setting period is determined. Therefore, the method of recording the determination result may be changed in accordance with the method of determining the set period.

In determining whether or not a backfire has occurred prior to supercharging in S10, it may be determined not based on whether or not a backfire has occurred once but based on whether or not a backfire has occurred a plurality of times. That is, it may be determined whether or not a backfire has occurred a predetermined plurality of times or more before supercharging. In S10, it is only necessary to determine whether or not a backfire has occurred prior to supercharging.

In S20, the adjusted supercharging pressure ΔQP was calculated from the correspondence with the occurrence frequency K of the backfire. The definition of the occurrence frequency K of the backfire to be used at that time is not limited to the number of backfires. The occurrence frequency K of the backfire may be any frequency as long as it can grasp a degree of occurrence of the backfire. For example, the occurrence frequency K of the backfire may be a ratio rather than the occurrence frequency of the backfire.

When the definition of the occurrence frequency K of the backfire is changed, the content of the specific map may be changed in accordance with the change.

The backfire generated at the closest point in time retroactively from the point in time when the supercharging request is made is referred to as the final backfire. As the occurrence frequency K of the backfire, a period from the occurrence timing of the final backfire to the time when the supercharging request is made may be adopted. Then, the shorter the period, the higher the occurrence frequency K of the backfire may be regarded.

The method of determining the setting period is not limited to the example of the above-described embodiment. For example, the set period may be a fixed value (hereinafter, referred to as a fixed set period). The fixed setting period may be, for example, about several minutes. Such a time scale is suitable for ascertaining whether or not the internal combustion engine 10 is in a situation where backfire is likely to occur at present.

When the fixed setting period is used, unlike the above-described embodiment in which the setting period is determined by the number of revolutions of the crankshaft 17 and thus the number of combustion cycles, the setting period is determined as an absolute time. In this case, when the occurrence frequency K of the backfire within the set period is calculated by S20, the occurrence frequency K of the backfire is easily grasped if there is a history of the backfire along the transition of the time, not the history of the backfire along the transition of the combustion cycle. In view of this, in the case of using the fixed setting period, the following first aspect may be adopted in order to record the occurrence state of the backfire in the first process. Here, in the above-described embodiment, the generated data group is created by sequentially recording the determination result not only when backfiring has occurred but also when backfiring has not occurred. In the first aspect, the information in the case where the backfire has not occurred is not recorded, and only the information in which the backfire has occurred is stored in the storage device 113. That is, only when the above-described specific condition is satisfied, the first specific information is stored in the storage device 113. The first specific information represents the time at the time when the specific condition is satisfied on a scale equal to or smaller than the second unit. If the time information is recorded, it is possible to determine whether or not the occurrence of the backfire is within the set period before the supercharging request by comparing the time when the supercharging request is made with the time when the backfire occurs when the supercharging request is made. In the first aspect, the generated data group is formed by accumulating such time information by a certain number of times that old data is being overwritten with new data. In such a generation data group, by omitting information indicating that a backfire has not occurred, it is possible to keep the number of data necessary for grasping the occurrence state of the backfire to a minimum. Therefore, the number of pieces of data constituting the generated data group can be set to be small. In addition, the data capacity of the generated data group can be reduced.

The set period may be defined as a period in which the vehicle 90 travels a predetermined travel distance (hereinafter, referred to as a specified distance). The defined distance may be any distance that defines a set time period from the same viewpoint as in the above-described embodiment, for example, the degree of 1 km. Hereinafter, a setting period determined by correspondence with the traveling distance of the vehicle 90 is referred to as a traveling setting period.

In the case of using the travel setting period, the following second aspect may be adopted in order to record the occurrence state of the backfire in the first process. That is, in the second aspect, as in the first aspect, the second specific information is stored in the storage device 113 only when the above specific condition indicating occurrence of backfire is satisfied. The second specifying information represents the value of the trip meter at the time when the specifying condition is satisfied in units of meters. That is, the generated data group in this case is obtained by accumulating the value of the trip meter 35 by a certain number of times that old data is being overwritten with new data. In this case, the value of the trip meter 35 is used in ascertaining the presence or absence of backfire in the travel setting period before supercharging, and thus the number of occurrences of backfire. Specifically, the occurrence of the backfire can be grasped in the following manner. Suppose there is a supercharging request. The value of the trip meter 35 at the time when the supercharging request is received is referred to as a request time meter value. A value smaller than the required meter value by a specified distance is called an inverse calculation value. If the value of the trip meter 35 stored in the storage device 113 is a value between the requested meter value and the back-calculated value, it can be seen that the backfire has occurred after the specified timing. The prescribed timing is a timing that is traced back from the time when the supercharging request is made by the traveling period of the prescribed distance, that is, a timing that is traced back from the time when the supercharging request is made by the traveling setting period. In this way, by determining whether the value of the trip meter 35 included in the generation data group is a value between the requested meter value and the inverse calculation value, it is possible to grasp the occurrence state of the backfire in the travel setting period before the supercharging is performed.

In the case of adopting the above-described travel setting period, it is preferable to adopt the occurrence rate of the backfire as the occurrence frequency K of the backfire used for calculating the adjusted supercharging pressure ΔQP. The reasons are as follows. Here, a situation in which the vehicle 90 travels by the above-described specified distance while keeping a certain gear position will be considered. Since the gear stage is constant, the number of revolutions of the crankshaft 17 and thus the number of combustion cycles required to travel the specified distance is determined to be a unique value corresponding to the wheel diameter and the gear ratio. The unique value is different for each gear stage. In other words, in a case where a certain shift stage continues in the travel setting period, the number of combustion cycles in the travel setting period is determined to be a value unique to each shift stage. Therefore, when the travel setting period is used, it is possible to count the number of occurrences of the backfire by aligning the number of combustion cycles for each shift stage, although it is conditional that the shift stage is constant in the travel setting period. With this in mind, when using the travel setting period, the following specification mode is also effective. That is, in the prescribed mode, the number of combustion cycles in the travel setting period is stored in advance in the storage device 113 for each shift stage. Then, when there is an acceleration request, the number of occurrences of backfire in the travel setting period before the acceleration request is divided by the number of combustion cycles corresponding to the gear stage in the travel setting period. As a result, the occurrence rate of backfire is calculated as the occurrence frequency K of backfire. Then, the adjusted supercharging pressure ΔQP is calculated by fitting the calculated occurrence rate of the backfire to the specific map. If the shift stage in the travel setting period is a constant case, the above-described regulation mode is also effective. In such a regulation mode, as the specific map, a map representing the relationship between the occurrence rate of the backfire and the adjusted supercharging pressure ΔQP may be created in advance. In this specific map, the larger the generation rate of the backfire, the larger the adjusted supercharging pressure ΔQP becomes. In addition, in the case of adopting the prescribed mode, the history of the target shift stage set as needed during the traveling of the vehicle 90 may be stored in the storage device 113. In this way, it is possible to grasp the gear stage in the travel setting period before the supercharging.

Employing the above defined aspect has the following advantages. First, as described above, by using the travel setting period, it is possible to count the number of occurrences of backfire by aligning the number of combustion cycles for each shift stage. In addition, by adopting the occurrence rate of the backfire, the occurrence frequency K of the backfire can be calculated by eliminating the influence of the difference in the number of combustion cycles for each shift stage. By calculating the adjusted supercharging pressure ΔQP from the occurrence frequency K, the adjusted supercharging pressure ΔQP can be calculated under the same criterion as to the ease of occurrence of backfire. Here, in the case of using the travel setting period, the above-described second aspect can be used for recording the occurrence state of the backfire. In this case, in the second aspect, the data capacity of the generated data group can be reduced as in the first aspect. Therefore, by combining the second aspect and the specified aspect, it is possible to set an appropriate adjustment supercharging pressure ΔQP while suppressing the data capacity.

When calculating the adjusted supercharging pressure ΔQP by S20, the parameter defining the magnitude of the adjusted supercharging pressure ΔQP (hereinafter, referred to as a specified parameter) is not limited to the occurrence frequency K of the backfire. The specified parameter may be any parameter as long as it is an index indicating an engine state regarding the likelihood of occurrence of backfire. The downstream intake air temperature T may be adopted as the specified parameter. In this case, for example, the adjusted supercharging pressure ΔQP may be calculated using the specific map for temperature shown in FIG. 6. The specified map represents the relation between the pre-intake air temperature TB that is the downstream intake air temperature T prior to the supercharging and the adjusted supercharging pressure ΔQP. The pre-intake air temperature TB is, for example, a mean of the downstream-intake air temperatures T in a predetermined period prior to the supercharging request, based on the time point at which the supercharging request is made. The fixed period is, for example, 1 minute, and is determined in advance as a length of time for which the average downstream intake air temperature T at the start of supercharging can be grasped. As a fixed period, a set period used in S10 may be adopted. In the specified map, the pre-intake air temperature TB and the adjusted supercharging pressure ΔQP are related as follows. When the pre-intake air temperature TB is less than the first threshold T1, the adjusted supercharging pressure ΔQP is zero. On the other hand, when the pre-intake air temperature TB is equal to or higher than the first threshold T1, the adjusted supercharging pressure ΔQP increases as the pre-intake air temperature TB increases. Furthermore, the rate of increasing the adjusted supercharging pressure ΔQP with respect to the pre-intake air temperature TB differs depending on the magnitude of the pre-intake air temperature TB even when the pre-intake air temperature TB is equal to or higher than the first threshold T1. Specifically, when the pre-intake air temperature TB is greater than or equal to the first threshold value T1 and less than the second threshold value T2, the increasing rate is greater when the pre-intake air temperature TB is greater than or equal to the second threshold value T2. In this setting, when the pre-intake air temperature TB is equal to or higher than the second threshold value T2, the adjusted supercharging pressure ΔQP becomes considerably large. The first threshold value T1 will be described. Here, it can be said that the higher the pre-intake air temperature TB, the more likely the backfire is to occur. The first threshold values T1 are defined as the smallest pre-intake air temperature TB that ensures that the internal combustion engine 10 is in an engine condition in which backfire is likely to occur, and that measures to prevent backfire from occurring are required. The second threshold value T2 will be described. The second threshold value T2 is defined as a pre-intake air temperature TB that requires considerable treatment in order to suppress generation of backfire. The particular maps including the first threshold value T1 and the second threshold value T2 are generated based on experimentation or simulations.

Figure 6:
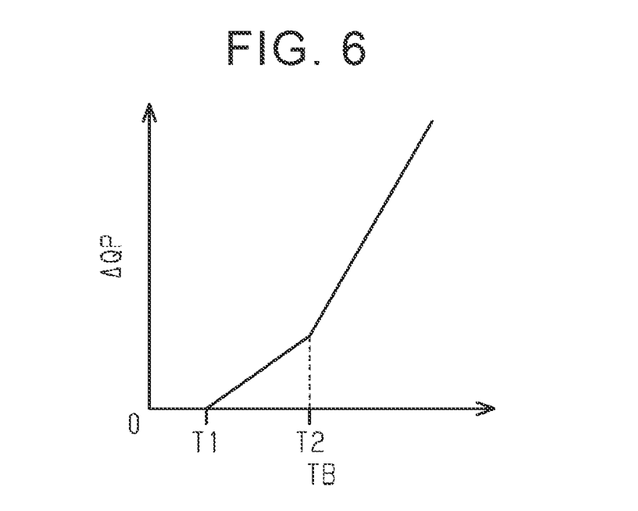
FIG. 6 is a diagram illustrating an example of a characteristic map.

When the specific map shown in FIG. 6 is applied to the configuration of the first embodiment, the following can be said. As described in the first embodiment, the adjusted supercharging pressure ΔQP corresponds to a reduction range from the basic supercharging pressure QPn in setting the target supercharging pressure QPt. That is, the large adjusted supercharging pressure ΔQP means that the target supercharging pressure QPt is made smaller than when no backfire occurs. Therefore, when the adjusted supercharging pressure ΔQP is set by using the above-described particular map, the higher the pre-intake air temperature TB is, the smaller the supercharging pressure QP is compared with the case where the backfire is not generated. If the basic supercharging pressure QPn is the same, the higher the pre-intake air temperature TB, the smaller the target supercharging pressure QPt. Then, by determining the reduction range of the target supercharging pressure QPt according to the ease of generation of the backfire in this manner, the backfire can be suppressed more appropriately.

Similarly, when the specific map shown in FIG. 6 is applied to the configuration of the second embodiment, the following can be said. As described in the second embodiment, the adjusted supercharging pressure ΔQP corresponds to a reduction range from the basic upper limit value Vs in setting the upper limit supercharging pressure Vm. That is, the large adjusted supercharging pressure ΔQP means that the upper limit supercharging pressure Vm is made smaller than when no backfire occurs. Therefore, when the adjusted supercharging pressure ΔQP is set by using the above-described particular map, the higher the pre-intake air temperature TB, the smaller the upper limit supercharging pressure Vm is compared with the case where the backfire is not generated. Then, by determining the lowering range of the upper limit supercharging pressure Vm according to the ease of occurrence of the backfire in this manner, the backfire can be suppressed more appropriately.

In order to calculate the adjusted supercharging pressure ΔQP using the specific map shown in FIG. 6, the history of the downstream intake air temperature T may be stored in the storage device 113. In this way, the pre-intake air temperature TB can be calculated from the time point to a predetermined time point.

As described in the above various modification examples, the contents of the specific map are not limited to the examples of the above embodiments. The content of the specific map may be changed as appropriate according to a method of determining a setting period, a specified parameter, and the like. It is sufficient that the specific map can appropriately calculate the adjusted supercharging pressure ΔQP. The specific map is not limited to a table or a graph, and may be a mathematical expression.

It is not essential to increase or decrease the adjusted supercharging pressure ΔQP in accordance with the occurrence frequency K of the backfire. That is, the adjusted supercharging pressure ΔQP may be set to a predetermined fixed value. The overall configuration of the internal combustion engine 10 is not limited to the example of the above-described embodiment. For example, the number of the cylinders 11 may be changed. The fuel injection valve 14 may be changed to a type that injects fuel directly into the cylinder 11. The fuel injected from the fuel injection valve 14 is not limited to hydrogen, and may be any gaseous fuel. If the downstream intake air temperature T is not used in both the first process and the second process, the intake air temperature sensor 34 may be eliminated. The internal combustion engine 10 may include a cylinder 11, an intake passage 12, and a supercharger 20.

The configuration of the supercharger 20 may be changed. For example, as the supercharger, it may be employed those of the variable displacement type comprising a nozzle vane. In order to make the actual supercharging pressure QP coincide with the target supercharging pressure QPt in the supercharging process, the opening degree of the nozzle vane may be changed. As the supercharger, an electric type supercharger in which the compressor wheel is rotated by an electric motor may be employed. In order to make the actual supercharging pressure QP coincide with the target supercharging pressure QPt in the supercharging process, the rotational velocity of the electric motor may be changed.

The overall configuration of the vehicle 90 is not limited to the example of the above-described embodiment. For example, a continuously variable transmission may be employed as the automatic transmission 85. The vehicle may have only the internal combustion engine 10 as a drive source. In this case, it is also possible to compensate for a decrease in torque of the internal combustion engine 10 caused by performing the second process, for example, by adjusting the ignition timing, the air-fuel ratio, or the like.

What is claimed is:

1. A control device of an internal combustion engine in which a control target is the internal combustion engine including a cylinder in which an air-fuel mixture of gaseous fuel and intake air is burned, an intake passage connected to the cylinder, and a supercharger that supercharges the intake air, wherein the control device executes:
    a first process of determining whether a backfire occurs based on an operating state of the internal combustion engine; and
    a second process of performing supercharging with a smaller supercharging pressure when a backfire has occurred in a predetermined set period before supercharging is performed by the supercharger than when a backfire has not occurred in the set period, wherein in the second process, the supercharging pressure is decreased as an occurrence frequency of the backfire in the set period is higher.

2. The control device according to claim 1, wherein when a vehicle equipped with the internal combustion engine is set as an equipped vehicle, the set period is a period in which the equipped vehicle travels a predetermined travel distance.

3. The control device according to claim 1, wherein:
    the internal combustion engine includes an intake temperature sensor that detects a temperature of the intake passage; and
    in the second process, the supercharging pressure is decreased as the temperature of the intake passage before supercharging is performed by the supercharger is higher.

4. A control device of an internal combustion engine in which a control target is the internal combustion engine including a cylinder in which an air-fuel mixture of gaseous fuel and intake air is burned, an intake passage connected to the cylinder, and a supercharger that supercharges the intake air, wherein the control device executes:
    a first process of determining whether a backfire occurs based on an operating state of the internal combustion engine; and
    a second process of performing supercharging with a smaller supercharging pressure when a backfire has occurred in a predetermined set period before supercharging is performed by the supercharger than when a backfire has not occurred in the set period, wherein the set period is a period in which a crankshaft of the internal combustion engine is rotated by a predetermined number of times.

5. A control device of an internal combustion engine in which a control target is the internal combustion engine including a cylinder in which an air-fuel mixture of gaseous fuel and intake air is burned, an intake passage connected to the cylinder, and a supercharger that supercharges the intake air, wherein the control device executes:
    a first process of determining whether a backfire occurs based on an operating state of the internal combustion engine; and
    a second process of decreasing an upper limit value of a supercharging pressure by the supercharger when a backfire has occurred in a predetermined set period before supercharging is performed by the supercharger, compared to when a backfire has not occurred in the set period, wherein in the second process, the supercharging pressure is decreased as an occurrence frequency of the backfire in the set period is higher.

* * * * *